(12) United States Patent
Phan et al.

(10) Patent No.: US 6,487,289 B1
(45) Date of Patent: Nov. 26, 2002

(54) MANAGING PRIORITIES FOR ROUTING CALLS IN A TELECOMMUNICATION NETWORK

(75) Inventors: Cao Thanh Phan, Rueil Malmaison (FR); Nhut Quan Tran, Cergy (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/442,639

(22) Filed: Nov. 18, 1999

(30) Foreign Application Priority Data

Nov. 26, 1998 (FR) .............................. 98 14878

(51) Int. Cl.$^7$ .............................. H04M 3/00; H04M 5/00
(52) U.S. Cl. .............. 379/243; 379/221.06; 379/114.02
(58) Field of Search ....................... 379/221.01–221.07, 379/219, 220.01, 229, 230, 242, 243, 114.02; 370/238, 360

(56) References Cited

U.S. PATENT DOCUMENTS

| | | | | |
|---|---|---|---|---|
| 5,289,536 A | * | 2/1994 | Hokari ........................ | 370/360 |
| 5,317,566 A | * | 5/1994 | Joshi .......................... | 370/238 |
| 5,452,351 A | * | 9/1995 | Yamamoto ............. | 379/114.02 |
| 5,715,304 A | * | 2/1998 | Nishida et al. ......... | 379/114.02 |
| 6,023,501 A | * | 2/2000 | Wakamatsu ............ | 379/114.02 |
| 6,289,096 B1 | * | 9/2001 | Suzuki .................... | 379/114.02 |

FOREIGN PATENT DOCUMENTS

EP 0 830 047 A2 3/1998

OTHER PUBLICATIONS

M. Peyravian et al, "Decentralized Network Connection Preemption Algorithms", Computer Networks And ISDN Systems, vol. 30, No. 11, Jun. 22, 1998, pp. 1029–1043 XP004123763.

Method For Efficiently Providing Different Levels of Network Availability in High–Speed Networks, IBM Technical Disclosure Bulleting, vol. 37, No. 1, Jan. 1, 1994 pp. 509–513, XP000428865.

* cited by examiner

*Primary Examiner*—Ahmad Matar
*Assistant Examiner*—Benny Q. Tieu
(74) *Attorney, Agent, or Firm*—Sughrue Mion, PLLC

(57) ABSTRACT

In a method of routing a call in a network with a plurality of nodes connected by trunks, each call is assigned a priority level as a function of which it can pre-empt calls in the network. The cost of different routes for routing the call is calculated and one route is chosen as a function of the cost. The cost of a route is a function of the maximum value on the trunks constituting the route, the priority level of the calls pre-empted on each of the trunks, the number of calls pre-empted on the trunks and the resources available on the trunks. The priority level of existing calls can therefore be taken into account when routing a call. The single figure of the accompanying drawing shows the typical trend of the cost function of a trunk as a function of the available resources.

6 Claims, 1 Drawing Sheet

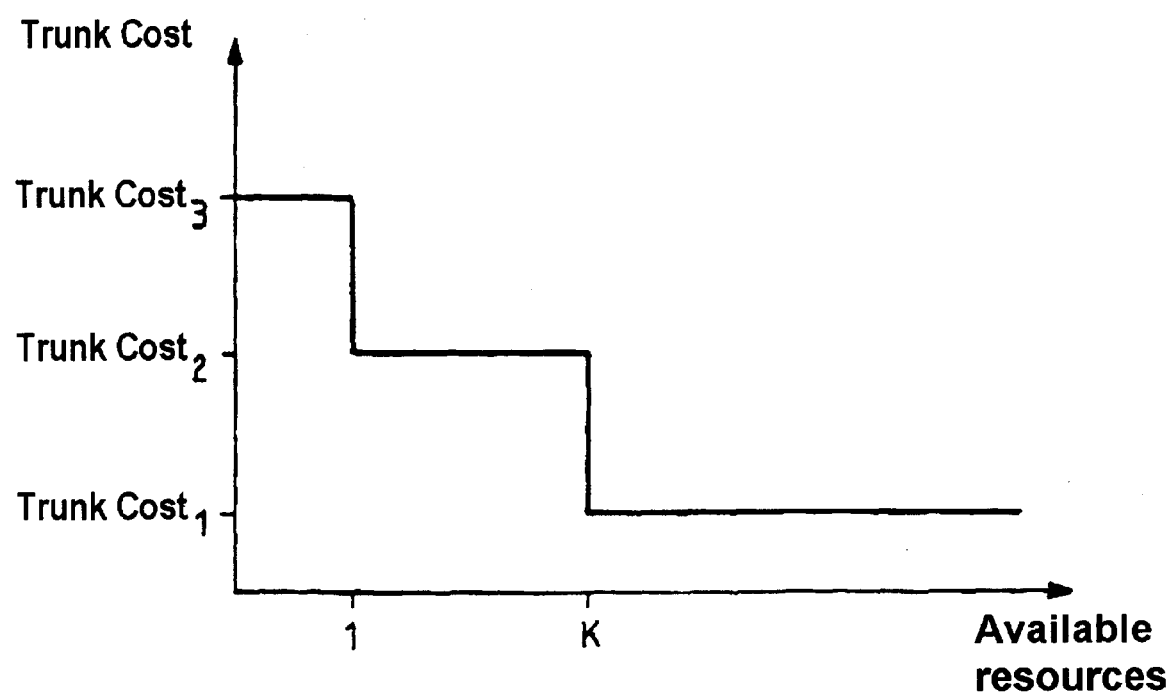

MANAGING PRIORITIES FOR ROUTING CALLS IN A TELECOMMUNICATION NETWORK

BACKGROUND OF THE INVENTION

1. Field of the Invention

The present invention concerns telecommunication networks and more particularly the routing of calls in a telecommunication network, in particular in a private network, in which calls have different priorities.

2. Description of the Prior Art

Private telecommunication networks are made up of communication nodes interconnected by trunks conveying calls and/or signaling. A description of physical and virtual private networks can be found in "Le RNIS appliqué au Centrex et aux réseaux privés virtuels" ["The ISDN applied to Centrex and to virtual private networks"] by J. Eldin and K. P. Lathia. As explained in the above document, in a physical private network, the various sites or nodes are connected by dedicated circuits whereas in a virtual private network each node is connected to the nearest local central office of the public network, where appropriate software sets up connections on demand. There are two variants of the virtual private network: on the one hand, semi-permanent connections can be provided and set up without dialing as soon as one of the nodes needs the circuit and which always connect the same two points. This can be the case for signaling links in particular, in an application on an integrated services digital network. On the other hand, switched connections can be provided, which can be set up only by dialing. The remainder of the description considers physical or virtual private networks made up of nodes connected by trunks which can be of any type: trunks comprising dedicated connections or trunks formed using an external network; the external network can be of any kind: the public switched network, a public land mobile network, an integrated services digital network, another private network, etc.

The problem arises in telecommunication networks of routing calls, i.e. of choosing the trunks to convey a call across the network, where appropriate with overflow to an external network. The objective of call routing is to set up a connection to convey the call in conjunction with distributing the call load across the network. In a manner that is well known in the art, routing calculations are carried out using a cost function defined for the trunks of the network. The function assigns each trunk a cost representative of the risk of blocking of the trunk; a cost function can be chosen that is calculated as the ratio between the resources required and the resources ovailable on the trunk:

cost:=required resources/available resources

In this case the best route is the one which minimizes the sum of the costs of the trunks constituting the route. A routing calculation is usually performed at the time of setting up a connection to convey the call.

It is well known in the art for calls in a private network to have different priorities. Choosing a high priority enables preferential routing of a call, if necessary by pre-empting resources of the private network which are being used by connections having a lower priority.

It has previously been proposed to manage priorities by defining a priority level and an activation mode for each call. The priority level is an integer, for example, and the activation mode is chosen from the following list:

unprotected call;
non-pre-empting protected call;
pre-empting protected call.

Using the above solution, a protected call cannot be pre-empted by another call. In other words, pre-emption applies to the lowest priority level unprotected call resources. It has also been previously proposed, in the event of network congestion, to apply the following constraints to routing a call:

the maximum priority of all the calls pre-empted to route a call must be as low as possible, the number of calls pre-empted must be as low as possible, and the overall routing cost must be as low as possible.

The invention addresses the problem of routing calls in a network which goes as far as possible towards satisfying the various priority constraints.

The problem of connection regression also arises in private networks. Because the networks convey different types of call (voice, data or other), different protocols propose, as a grade of service, connections having different allocated throughputs. This applies to the X25 or Frame Relay protocols, for example, which authorize fallback to smaller bandwidths if the required bandwidth is not available.

Another problem addressed by the invention is that of simultaneously managing the allocated throughputs and the priorities when routing calls. The invention manages the priorities as a function of throughput classes.

SUMMARY OF THE INVENTION

To this end, the invention proposes a method of routing a call in a network with a plurality of nodes connected by trunks wherein each call is assigned a priority level as a function of which it is able to pre-empt calls in the network, the method comprising the calculation of the cost of various routes for routing the call and choosing one route as a function of the cost, wherein the cost of a route is a vector having a first component equal to the maximum value on the trunks constituting the route of the priority level of calls pre-empted on each of the trunks, a second component equal to the number of calls pre-empted on the trunks per priority level, and a third component equal to the sum of a decreasing function of the quantity of resources available on each of the trunks, and the second component of a given cost vector is less than the second component of another cost vector if, for the highest priority level for which the second components are different, the second component of the given cost vector is less than the second component of the other cost vector.

In this case, the aforementioned choice minimizes the cost of the route for an order relationship in which a first vector is less than a second vector if the first component of the first vector is less than the first component of the second vector, or, if the first components are equal, if the second component of the first vector is less than the second component of the second vector, or, if the first and second components are equal, if the third component of the first vector is less than the third component of the second vector.

In another embodiment the network routes calls at different throughputs, with the possibility of throughput regression, and the cost of a route is also a function of the throughput that the route can carry.

To this end the invention proposes a method of routing a call in a network with a plurality of nodes connected by trunks wherein each call is assigned a priority level as a function of which it can pre-empt calls in the network, the method including calculating the cost of various routes for routing the call and choosing a route as a function of the cost, wherein the network routes calls at different throughputs, with the possibility of throughput regression, and wherein the cost of a route is also a function of the throughput that can be conveyed on the route, the cost of a route being a vector having a first component equal to the regression on the route of the throughput requested for a call, a second component equal to the maximum value of the minimum priority level of the pre-empted calls of each of the trunks constituting the route, a third component equal to the number of pre-empted calls on the trunks, and a fourth component equal to the sum of a decreasing function of the quantity of resources available on each of the trunks, and the third component of a given cost vector is less than the third component of another cost vector if, for the highest priority level for which the third components are different, the third component of the given cost vector is less than the third component of the other cost vector.

In this case, the aforementioned choice minimizes the cost of the route for an order relationship in which a first vector is less than a second vector if the first component of the first vector is less than the first component of the second vector, or, if the first components are equal, if the second component of the first vector is less than the second component of the second vector, or, if the first and second components are equal, if the third component of the first vector is less than the third component of the second vector, or, if the first, second and third components are equal, if the fourth component of the first vector is less than the fourth component of the second vector.

In one embodiment the route cost is calculated iteratively by adding the various trunks constituting the route successively.

The Dijkstra algorithm con also be used to calculate the various routes and to choose the one route.

Other features and advantages of the invention will become apparent on reading the following description of embodiments of the invention, given by way of example and with reference to the accompanying drawing.

BRIEF DESCRIPTION OF THE DRAWING

The single FIGURE in the accompanying drawing shows a graph of the load component of the cost vector in one embodiment of the invention.

DETAILED DESCRIPTION OF THE PREFERRED EMBODIMENT

The invention proposes to take account of priority parameters in defining costs and calculating routes in a telecommunication network. It enables the network to comply with priority constraints when setting up connections and routing calls. To this end, the invention proposes to consider a cost function Cost for the trunks of the network which is in vector form, i.e. which has two independent components. The cost vector has one component which is a function of the priority of the connections pre-empted to perform the routing and a trunk load function component. The cost vector can therefore take the form:

Cost:=(MinPriority; TrunkCost)

The first component MinPriority is the component representing the maximum priority level of calls pre-empted on the trunk to route a new call. It is equal to the maximum priority of the calls to be pre-empted on the trunk to convey a new call. If the trunk is not congested, this component is a null component. However, if the trunk is congested, this component is equal to the priority level of the lowest priority call which can be pre-empted.

This component takes into account not only the load on the trunks but also the priority levels of calls already set up, and which have to be pre-empted, in calculating a route in the private network. It is representative of the capacity of the trunk to accept pre-empting calls.

The second component TrunkCost is a function of the load on the trunk or the available resources, and is described in more detail hereinafter with reference to the figure.

The invention also proposes to consider a cost function Ch for the available routes which also is in vector form, i.e. which has three independent components. This cost vector has one component which is a function of the maximum priority of the pre-empted calls on the various trunks constituting the route. It also has a component representing the number of unprotected calls that must be pre-empted in order to route the call, for each priority level. The third component is a route load component. The cost vector can therefore be represented in the following form:

Ch:=(MaxPriority; NoPre-EmptCalls[priority], LoadCost)

The first component MaxPriority is a function of the priority level of calls pre-empted on the various trunks constituting the route. It takes into account not only the load of the trunks but also the priority levels of calls already established which are pre-empted to provide the route in calculating a route in the private network. Minimizing this first component amounts to pre-empting calls with the lowest priority to provide the route. The second component is a function of the number of pre-empted calls for each priority level. It is therefore in the form of a table. The third component, LoadCost, is a function of the load of the trunk, and corresponds to the TrunkCost component of the trunks used.

The cost vector of a route is defined iteratively, from the cost vectors of the various trunks constituting the route. To add a trunk having a cost Cost to a route having a cost vector Ch, an addition function can be defined as follows:

Add($Ch_1$, Cost):=$Ch_2$

This function obtains the cost vector $Ch_2$ of the route including the added trunk from the cost vector $Ch_1$ of the route and the cost vector of the added trunk. Each component of the vector is defined using the following notation:

$Ch_2$:=(MaxPriority$_2$; NoPre-EmptCalls$_2$[priority], LoadCost$_2$)

For the first component, representing the maximum priority of the calls pre-empted on the various trunks, the first component of the sum is equal to the highest priority value of the calls pre-empted on the preceding route and the maximum priority of the calls pre-empted on the added trunk. In other words, when a trunk is added to a given route, the maximum priority of the calls pre-empted on the trunks in the new route does not increase unless the maximum priority of the calls to be pre-empted on the added trunk is greater than the maximum priority of calls pre-empted on the trunks of the given route. This is written:

MaxPriority$_2$:=Max[MaxPriority$_1$, MinPriority]

where the function Max associates with a pair of numbers the larger of the two numbers.

For the second component, representing the number of calls pre-empted, if the trunk is not congested the second component of the sum is equal, for each priority level, to the second component of the preceding route. If the trunk is congested, routing the call implies pre-empting a call at priority level MinPriority and the number of pre-empted calls at this priority level increases by one.

This is written:

IF ArteryCost=CONGESTED, THEN
   NoPre-EmptCalls$_2$[MinPriority]=NoPre-EmptCalls$_1$[MinPriority]+1
ENDIF The value CONGESTED for the trunk is the value of the trunk cost component if the trunk has no more resources available, in other words when it is necessary to pre-empt a call in order to route the call.

The third component, LoadCost, is obtained by adding the cost of the trunk to the cost of the preceding route. In other words, the load component of a route is equal to the sum of the load components of all the trunks that constitute the route. This is written:

LoadCost$_2$:=ArteryCost+LoadCost$_1$

The addition function defined above associates a cost vector with each route across the private network. The invention also proposes an order relationship in the cost vector space so that routes can be compared to define a "best" route. This order relationship is defined as follows:

| $Ch_1 < Ch_2$ | |
|---|---|
| IF | MaxPriority$_1$ < MaxPriority$_2$ |
| OR IF | (MaxPriority$_1$ = MaxPriority$_2$ AND NoPre-EmptCalls$_1$[priority] < NoPre-EmptCalls$_2$[priority]) |
| OR IF | (MaxPriority$_1$ = MaxPriority$_2$ AND NoPre-EmptCalls$_1$[priority] = NoPre-EmptCalls$_2$[priority] AND LoadCost$_1$ < LoadCost$_2$) |

This definition includes an order relationship and an equality relationship between the components NoPre-EmptCalls[priority]. Two tables of numbers of pre-empted calls are equal if their respective values for each priority level are equal. If not, the numbers of calls pre-empted are compared, starting from the highest priority level, and stopping as soon as there is a difference; in other words:

NoPre-EmptCalls$_1$[priority]<NoPre-EmptCalls$_2$[priority]
   if for i=Max{j/NoPre-EmptCalls$_1$[j]NoPre-EmptCalls$_2$[j]}
   then NoPre-EmptCalls$_1$[i]<NoPre-EmptCalls$_2$[i]

This amounts to minimizing the number of high-level calls pre-empted.

In other words, a route is "better" than another route if it uses only trunks with a lower pre-empted call priority level. If two routes use trunks with the same maximum pre-empted call priority level, the "best route" is the one which minimizes the number of calls pre-empted at that level. If two routes use trunks with pre-empted calls having the same maximum priority level and pre-empt the same number of calls, then the best route is the one with the lowest cost.

This definition of an order relationship is equivalent to a network management choice. Minimizing the first component amounts to limiting the priority level of calls pre-empted in the network, where appropriate to the detriment of the number of calls pre-empted or the cost of the route. Seeking to minimize the second component before the third one amounts to preferring to reduce the number of pre-empted calls rather than to reduce the cost of routing a call. Other order relationships could be defined to comply with other constraints on the network.

The above definitions of a routing cost and of an order relationship between routes enable different available routes to be assessed and compared in order to choose one of them.

The Dijkstra algorithm is advantageously used to determine a call route which minimizes the cost vector defined above, in the sense of the previously mentioned order relationship. The Dijkstra algorithm is described in books on algorithms and is used to find a shortest path between two nodes of a valued graph. In applying the algorithm to the present invention, the nodes of the graph are the nodes of the network. The paths between the nodes are trunks of the private network, or overflows via an external network where this is possible. The distance is the cost vector defined above. The iterative definition of this vector is particularly suitable for the Dijkstra algorithm, in which each iteration adds trunks to an existing route. The standard order relationship of the real numbers is replaced in the application of the algorithm by the order relationship defined above. Algorithms analogous to the Dijkstra algorithm which also determine a shortest path can also be used for routing calculations in accordance with the invention. Examples are the Bellman algorithm and the Floyd algorithm. Note that the Bellman algorithm applies only to circuit-less graphs.

The figure shows one form of the second component, TrunkCost, of the cost vector of a trunk, which is a function of the load or the available resources. The TrunkCost component is plotted on the vertical axis. The available resources are plotted on the horizontal axis. In the case of an ISDN, in which the trunk is formed of a plurality of T0 or T2 accesses, for example, the available resources correspond to the number of free B channels. The figure essentially shows that the TrunkCost component is an increasing function of the load or, which is strictly equivalent, a decreasing function of the resources available on the trunk. This function has a constant value below a given value of the load or, which amounts to the same thing, a constant value above a certain value of the available resources.

In the example, the load has an infinite value—i.e. a value higher than any other—if the trunk is cut. It has a value "CONGESTED" if no channel is available. This "CONGESTED" value is chosen to be greater than the sum of all possible costs of a route via B channels. It has a first value TrunkCost$_3$ if only one channel is available, a second value TrunkCost$_2$ if 2 to k channels are available, where k is an integer, and a value TrunkCost$_1$=1 if more than k channels are available, with TrunkCost$_3$>TrunkCost$_2$>TrunkCost$_1$. A value of k in the order of 10 is appropriate. Choosing a relatively low value of k avoids recalculating the routes if the cost does not vary. Other values are feasible, in particular, as a function of the capacity of a trunk and the number of channels occupied by a call. The choices of the values TrunkCost$_j$, the number of values TrunkCost$_j$, and the load values for which the function changes value depend on the nature of the network and the required load distribution. Those values can be absolute values—as in the example—or a function of the total capacity of the trunk.

A second embodiment of the invention will now be described which is more particularly suitable for networks using an X25 type protocol and in which priority is managed by throughput class. In this case, the invention proposes to provide in the cost vector of the trunks or the routes a component which represents the throughput class and the imposed regression on a route.

In this embodiment of the invention, each trunk is associated with a cost which is of vector form, as previously, and can be written:

Cost:=(InfoPre-Empt[ThroughputClass]; TrunkCost)

The second component is identical to that of the first embodiment. The first component is a vector which is a function of the throughput class and which for a given throughput indicates:

the number NoPre-EmptCalls[priority] of calls to be pre-empted per priority level to obtain the given throughput, and the maximum priority level MaxPriority of calls preempted on the trunk.

In this embodiment of the invention, each route is associated with a component representing the regression in terms of throughput that the route implies, relative to the requested throughput. For a requested throughput, the cost vector for a route can be written:

Ch[RequestedThroughput]:=(RegressedThroughput, MaxPriority; NoPre-EmptCalls[priority], LoadCost)

in which the last three components are those defined above. The first component is the component representative of the throughput regression. It indicates the regression for the route relative to the requested throughput.

The addition function defined above is modified in the following manner. The throughput available for the call on the trunk to be added is first calculated for a given route and for a trunk to be added. This throughput depends on the priority of the call to be routed and on the distribution of the priorities of non-protected calls on the trunk in question, i.e. the first component of the vector Cost defined at this time.

In other words, the aim is to determine the throughput that the trunk to be added can convey, given the priority level of the call to be routed. If the route already obtained already implies a regression, it is not necessary to seek to exceed the throughput available on that route and it is sufficient to pre-empt, on the trunk to be added, sufficient existing non-protected calls to provide the regressed throughput previously obtained.

The following are determined in this way from the regressed throughput of the preceding route, the priority of the call to be routed and the calls on the trunk to be added:

the throughput available on the trunk, the number of calls to be pre-empted per throughput class, and the maximum priority of the calls to be pre-empted on the added trunk per throughput class.

The names of these parameters are RegressedThroughput, NoPre-EmptCalls[priority] and TransitPriority [throughputclass].

For the regression component, the regression on the sum route is calculated as whichever is the greater value of:

the regression on the preceding route, and where applicable, the additional regression on the added trunk, so in fact:

RegressedThroughput$_2$:=Max(RegressedThroughput$_1$; RequestedThroughput−AvailableThroughput)

if the available throughput is less than the requested throughput, or, otherwise:

RegressedThroughput$_2$:RegressedBirate$_1$

The regressed throughput component of the sum route is therefore equal to the regression that the route implies, allowing for the added trunk.

Compared to the preceding embodiment, the calculations to determine the MaxPriority and NoPre-EmptCalls [priority] components of the sum are modified to allow for the fact that it may be necessary to pre-empt a plurality of calls at a lower level to provide the requested throughput.

Then, per throughput class and for the maximum priority level of calls on the trunks constituting the sum route:

MaxPriority$_2$:=Max[MaxPriority$_1$, TransitPriority]

For the number of calls pre-empted per throughput class:

NoPre-EmptCalls$_2$[priority]:=NoPre-EmptCalls$_1$[priority]+NoPre-EmptCalls[priority]

i.e. the number of calls that it is necessary to pre-empt to convey the call over the added trunk is added to the preceding number of pre-empted calls.

In this embodiment, the definition of the cost vector of a route allows for the possibility of regression.

The order relationship between two routes becomes, with the same notation and for a given requested throughput:

| | $Ch_1 < Ch_2$ |
|---|---|
| IF | RegressedThroughput$_1$ < RegressedThroughput$_2$ |
| IF | (RegressedThroughput$_1$ = RegressedThroughput$_2$ AND MaxPriority$_1$ < MaxPriority$_2$) |
| OR IF | (RegressedThroughput$_1$ = RegressedThroughput$_2$ AND MaxPriority$_1$ = MaxPriority$_2$ AND NoPre-EmptCalls$_1$[priority] < NoPre-EmptCalls$_2$[priority]) |
| OR IF | (RegressedThroughput$_1$ = RegressedThroughput$_2$ AND MaxPriority$_1$ = MaxPriority$_2$ AND NoPre-EmptCalls$_1$[priority] = NoPre-EmptCalls$_2$[priority] AND LoadCost$_1$ < LoadCost$_2$) |

In other words, one route is "better" than another if it enables the call to be set up with a lower throughput regression. For two routes implying the same regression, the better route is the one which uses the trunks with the lowest priority level pre-empted calls. If two routes imply the same regression and use trunks with the same priority level pre-empted calls, the "best route" is the one which minimizes the number of high priority level calls pre-empted. If two routes imply the same regression, use trunks with the same pre-empted call priority level and pre-empt the some number of calls, then the best route is the one which has the lowest cost.

This definition of an order relationship is equivalent to a network management choice in which call routing without regression is the primary aim. Thereafter, minimizing the second component amounts to limiting the priority of the pre-empted calls in the network, where applicable to the detriment of the number of calls pre-empted or to the routing cost. Seeking to minimize the second component before the third one amounts to preferring to reduce the number of pre-empted calls rather than to reduce the cost of routing a call. Once again, other order relationships could be defined to satisfy other network constraints.

In this embodiment, as in the preceding one, the routes can be calculated using the Dijkstra algorithm or the similar algorithms mentioned above.

Of course, the present invention is not limited to the examples and embodiments described and shown, and is susceptible to many variants that will suggest themselves to the skilled person. It applies to network types other than the private networks mentioned in the description. It is also clear that the invention is not limited to the embodiments described. Different definitions can be chosen for the components of the cost vector and of the order relationship, depending on the constraints of the network in which the invention is applied. The invention applies independently of the existence of protected calls.

There is claimed:

1. A method of routing a call in a network with a plurality of nodes connected by trunks wherein each call is assigned a priority level in order to pre-empt calls in the network, said method comprising:

calculating the cost of various routes for routing the call:
choosing one route as a function of the cost, wherein the cost of a route is a vector having
a. a first component equal to the maximum value on the trunks constituting the route of the priority level of calls pre-empted on each of said trunks, b. a second component equal to the number of calls pre-empted on said trunks per priority level, and c. a third component equal to the sum of a decreasing function of the quantity of resources available on each of said trunks, wherein said second component of a given cost vector is less than said second component of another cost vector if, for the highest priority level for which said second components are different, said second component of said given cost vector is less than said second component of said other cost vector.

2. The method of claim 1, wherein said route choice minimizes the cost of said route for an order relationship in which a first vector is less than a second vector if the first component of said first vector is less than the first component of said second vector, or, if said first components are equal, if the second component of said first vector is less than the second component of said second vector, or, if said first and second components are equal, if the third component of said first vector is less than the third component of said second vector.

3. A method of routing a call in a network with a plurality of nodes connected by trunks wherein each call is assigned a priority level in order to pre-empt calls in the network, said method comprising:

calculating the cost of various routes for routing the call; and choosing a route as a function of the cost, wherein said network routes calls at different throughputs, with the possibility of throughput regression, and wherein the cost of a route is also a function of the throughput on said route, the cost of a route being a vector having a. a first component equal to the regression on said route of the throughput requested for a call, b. second component equal to the maximum value of the minimum priority level of the pre-empted calls of each of the trunks constituting said route, c. a third component equal to the number of pre-empted calls on said trunks, and d. a fourth component equal to the sum of a decreasing function of the quantity of resources available on each of said trunks, and wherein the third component of a given cost vector is less than the third component of another cost vector if, for the highest priority level for which said third components are different, said third component of said given cost vector is less than said third component of said other cost vector.

4. The method claimed in claim 3, wherein said choice minimizes the cost of the route for an order relationship in which a first vector is less than a second vector if the first component of said first vector is less than the first component of said second vector, or, if said first components are equal, if the second component of said first vector is less than the second component of said second vector, or, if the first and second components are equal, if the third component of said first vector is less than the third component of said second vector, or, if the first, second and third components are equal, if the fourth component of said first vector is less than the fourth component of said second vector.

5. The method claimed in claim 1, wherein said route cost is calculated iteratively by adding the various trunks constituting the route successively.

6. The method claimed in claim 1, wherein the Dijkstra algorithm is used to calculate said various routes and to choose said one route.

* * * * *